(12) United States Patent
Kodama et al.

(10) Patent No.: US 9,030,706 B2
(45) Date of Patent: May 12, 2015

(54) METHOD OF ADDING VALUE TO PRINT DATA, A VALUE-ADDING DEVICE, AND A RECORDING MEDIUM

(71) Applicant: Seiko Epson Corporation, Tokyo (JP)

(72) Inventors: Tomohiro Kodama, Matsumoto (JP); Hitoshi Oyama, Matsumoto (JP); Tadashi Furuhata, Shiojiri (JP); Akio Takamoto, Matsumoto (JP)

(73) Assignee: Seiko Epson Corporation, Suwa-shi (JP)

( * ) Notice: Subject to any disclaimer, the term of this patent is extended or adjusted under 35 U.S.C. 154(b) by 0 days.

(21) Appl. No.: 14/470,045

(22) Filed: Aug. 27, 2014

(65) Prior Publication Data

US 2014/0362412 A1    Dec. 11, 2014

Related U.S. Application Data

(63) Continuation of application No. 13/239,790, filed on Sep. 22, 2011, now Pat. No. 8,861,016.

(30) Foreign Application Priority Data

Sep. 22, 2010   (JP) .................................. 2010-211601

(51) Int. Cl.
  *G06K 15/00*   (2006.01)
  *G06K 15/02*   (2006.01)
  (Continued)

(52) U.S. Cl.
  CPC .............. *G06K 15/18* (2013.01); *G06F 3/1206* (2013.01); *G06F 3/1243* (2013.01);
  (Continued)

(58) Field of Classification Search
  CPC ...................................................... G07G 1/0009
  USPC ......................................................... 358/1.18
  See application file for complete search history.

(56) References Cited

U.S. PATENT DOCUMENTS 5,678,059 A    10/1997   Ramaswamy et al.
6,263,384 B1   7/2001    Yanase
(Continued)

FOREIGN PATENT DOCUMENTS

CN    101344869 A    1/2009
EP    1 764 680 A2   3/2007
(Continued)

OTHER PUBLICATIONS

Extended European Search Report issued Dec. 27, 2011 for Application No. 11179255.2 (6 Pages).

*Primary Examiner* — Benjamin O Dulaney
(74) *Attorney, Agent, or Firm* — Nutter McClennen & Fish LLP; John J. Penny, Jr.

(57) ABSTRACT

Various kinds of value can be easily added to print data output from an existing application without modifying the existing application program. A value-adding method executes a process of adding value to print data output from an application on a computer that has one or more communication ports and executes a specific process by means of an application, and includes a data acquisition step of acquiring the print data at the operating system kernel layer before the print data is received at the communication port, and a data processing step that applies at the application layer a process of adding and/or deleting print content in the print data based on previously registered information, and outputs the data after processing to the specified communication port.

8 Claims, 5 Drawing Sheets

(51) Int. Cl.
*G06F 3/12* (2006.01)
*G07G 1/00* (2006.01)
*G07G 5/00* (2006.01)
*G06Q 20/20* (2012.01)

(52) U.S. Cl.
CPC ........... *G06F 3/1244* (2013.01); *G06F 3/1251* (2013.01); *G06F 3/1284* (2013.01); *G07G 1/0009* (2013.01); *G07G 5/00* (2013.01); *G06Q 20/20* (2013.01)

(56) References Cited

U.S. PATENT DOCUMENTS

| | | | |
|---|---|---|---|
| 7,014,110 B2 * | 3/2006 | Minowa et al. | 235/383 |
| 7,239,413 B2 | 7/2007 | Owen et al. | |
| 7,454,762 B2 | 11/2008 | Brake, Jr. et al. | |
| 7,731,084 B2 | 6/2010 | Redick et al. | |
| 8,348,750 B2 * | 1/2013 | Jordan et al. | 463/25 |
| 8,526,045 B2 | 9/2013 | Furuhata et al. | |
| 8,693,036 B2 | 4/2014 | Oyama et al. | |
| 8,861,009 B2 | 10/2014 | Furuhata et al. | |
| 8,861,016 B2 | 10/2014 | Kodama et al. | |
| 2001/0032266 A1 * | 10/2001 | Minowa | 709/229 |
| 2002/0089687 A1 | 7/2002 | Ferlitsch et al. | |
| 2002/0154333 A1 | 10/2002 | Akashi | |
| 2003/0036979 A1 * | 2/2003 | Tokorotani | 705/27 |
| 2005/0028093 A1 * | 2/2005 | Michel et al. | 715/526 |
| 2005/0211773 A1 | 9/2005 | Nobutani | |
| 2006/0197969 A1 | 9/2006 | Takagi | |
| 2008/0165285 A1 | 7/2008 | Thompson et al. | |
| 2009/0066996 A1 * | 3/2009 | Minowa | 358/1.15 |
| 2009/0116053 A1 | 5/2009 | Selvaraj | |
| 2009/0237717 A1 | 9/2009 | Takamoto et al. | |
| 2010/0157348 A1 | 6/2010 | Takagi | |
| 2010/0182638 A1 | 7/2010 | Kimura et al. | |
| 2011/0184822 A1 * | 7/2011 | Matkovic | 705/18 |
| 2012/0057184 A1 | 3/2012 | Furuhata et al. | |
| 2012/0057202 A1 | 3/2012 | Oyama et al. | |
| 2012/0069404 A1 | 3/2012 | Kodama et al. | |
| 2013/0057885 A1 | 3/2013 | Minowa | |
| 2013/0314727 A1 | 11/2013 | Furuhata et al. | |
| 2013/0321845 A1 | 12/2013 | Takamoto | |
| 2014/0362413 A1 | 12/2014 | Furuhata et al. | |

FOREIGN PATENT DOCUMENTS

| | | |
|---|---|---|
| JP | 08-069427 A | 3/1996 |
| JP | 10-187393 A | 7/1998 |
| JP | 11-134272 A | 5/1999 |
| JP | 2001-357457 A | 12/2001 |
| JP | 2005-321873 A | 11/2005 |
| JP | 2006-239946 A | 9/2006 |
| JP | 2006-260455 A | 9/2006 |
| JP | 2006-338443 A | 12/2006 |
| JP | 2007-004558 A | 1/2007 |
| JP | 2007-058463 A | 3/2007 |
| JP | 2007-304799 A | 11/2007 |
| JP | 2009-226689 A | 10/2009 |
| JP | 2009-226690 A | 10/2009 |
| JP | 2010-186458 A | 8/2010 |
| KR | 2007-0107765 A | 11/2007 |

* cited by examiner

METHOD OF ADDING VALUE TO PRINT DATA, A VALUE-ADDING DEVICE, AND A RECORDING MEDIUM

This application is a continuation of and claims priority under 35 U.S.C. §120 to, U.S. patent application Ser. No. 13/239,790 filed on Sep. 22, 2011, which claims priority under 35 U.S.C. §119 from Japanese patent application no. JP 2010-211601 filed on Sep. 22, 2010, each of which is hereby incorporated by reference in its entirety.

BACKGROUND

1. Technical Field

The present invention relates to a value-adding method and device for adding value to print data output from an existing application, and relates more particularly to a value-adding method and device that can easily add different kinds of value without modifying the existing application program.

2. Related Art

POS systems, which are a type of sales management system, are commonly used in supermarkets and other retail stores. The POS server and plural POS terminals (registers) of a POS system are connected over a network, and each operates and runs specific processes based on the applications installed in each device. A printer is normally connected to each POS terminal, and outputs receipts and coupons as instructed by the application. Systems that are architecturally similar to POS systems and output information in various forms are also deployed in businesses such as hospitals and shipping companies.

Adding new functions and replacing system components is often necessary in such systems as technology improves and business needs change, but because such systems are usually central to business operations, and are connected Co other systems in complex ways, modifying the applications that are used is not easy.

To address this problem as it relates to output process functions, Japanese Unexamined Patent Appl. Pub. JP-A-H08-69427 teaches a device that renders a modem function in a personal computer that can eliminate the microprocessor and memory required in a conventional modem without needing to modify the existing application program.

Japanese Unexamined Patent Appl. Pub. JP-A-2006-338443 teaches a device that can access one communication port and cause a printer connected to another communication port to simultaneously print a duplicate copy without modifying the application program.

JP-A-H08-69427 and JP-A-2006-338443 only address limited output system functions such as the modem and a duplicate printing function, however, and do not address many other needs. In addition, because JP-A-2006-338443 operates at the operating system kernel level, constructing new functions (program development) is not generally easy and function is limited.

There is also a desire to add marketing value to receipts in existing POS systems by, for example, outputting coupons or advertisements to the receipts printed by the POS system.

SUMMARY

A value-adding method and device according to the invention for adding value to print data output from an existing application enable easily adding different types of value without changing the existing application program.

A first aspect of the invention is a value-adding method that runs on a computer that operates according to an operating system on the operating system, kernel layer, executes a specific process according to an application on an application layer, and has one or more communication ports, the value-adding method executing a process of adding value to print data output from am application to a communication port including: a data acquisition step in which the computer acquires the print data at the operating system kernel layer before the print data is received at the communication port; and a data processing step in which at the application layer the computer applies a process of adding and/or deleting print content in the print data acquired in the data acquisition step based on information previously registered in the computer, and outputs the data after processing to the specified communication port.

Preferably, the process of adding or deleting print content is determined based on information contained in the acquired print data.

In another aspect of the invention, the process of adding or deleting print content is determined based on time information kept by the computer.

In another aspect of the invention, the data processing step includes a step of receiving selection information; and the process of adding or deleting print content is determined based on the received selection information.

In another aspect of the invention, the data processing step includes a step of accumulating specific information contained in the print data in the computer; and the process of adding or deleting print content is determined based on the accumulated information.

Another aspect of the invention also has a step of displaying a screen prompting input to the computer on a display unit of the computer, receiving information input to the screen, and generating the information pre-stored in the computer according to the received information.

In another aspect of true invention, the print data is data for a receipt, and adding print content is adding a coupon.

In another aspect of the invention, the print data is data for a receipt, and adding print content is adding an advertisement or logo.

Another aspect of the invention is a value-adding device rendered by a computer that operates according to an operating system on the operating system kernel layer, executes a specific process according to an application on an application layer, and has one or more communication ports, and executes a process of adding value to print data output from an application to a communication port, the value-adding device including a data acquisition unit that acquires the print data at the operating system kernel layer before the print data is received at the communication port; and a data processing unit that at the application layer the computer applies a process of adding and/or deleting print content in the print data acquired by the data acquisition, unit based on information previously registered in the computer, and outputs the data after processing to the specified communication port.

another aspect of the invention is a computer-readable recording medium storing a program that causes a computer to execute the steps of the value-adding method described herein.

Other objects and features together with a fuller understanding of the invention will become apparent and appreciated by referring to the following description and claims taken in conjunction with the accompanying drawings.

DESCRIPTION OF EMBODIMENTS

Figure 1:
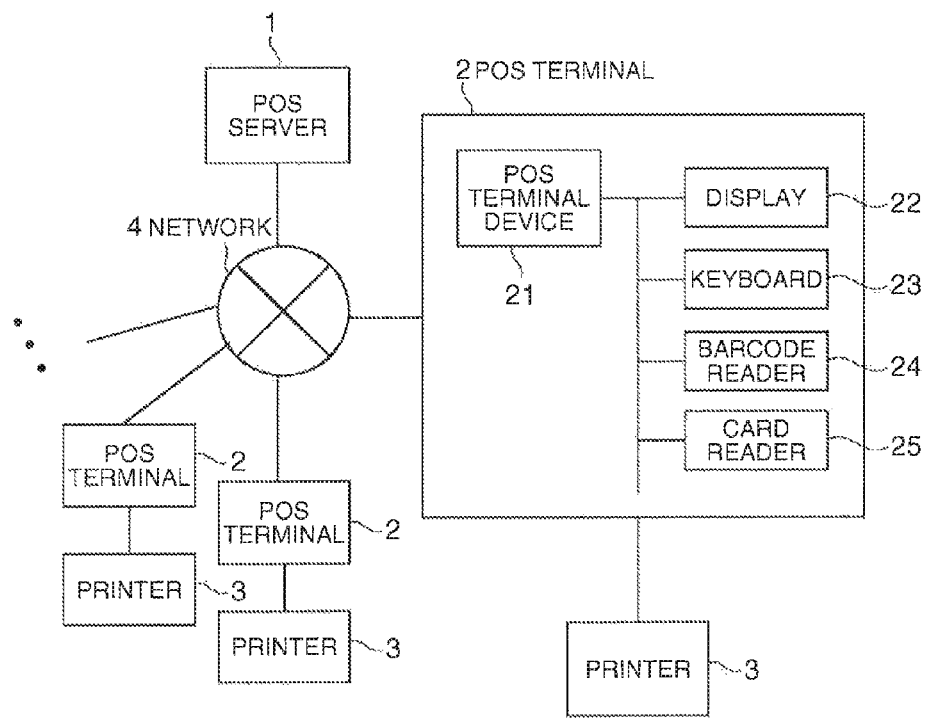
FIG. 1 is a block diagram showing the configuration of a POS system and POS terminal devices according to the invention.

Preferred embodiments of the present invention are described below with reference to the accompanying figures. The following embodiments do not, however, limit the scope of the invention as described in the following claims. Note, further, that identical or like parts are referenced by like reference numerals in the accompanying figures.

Figure 2:
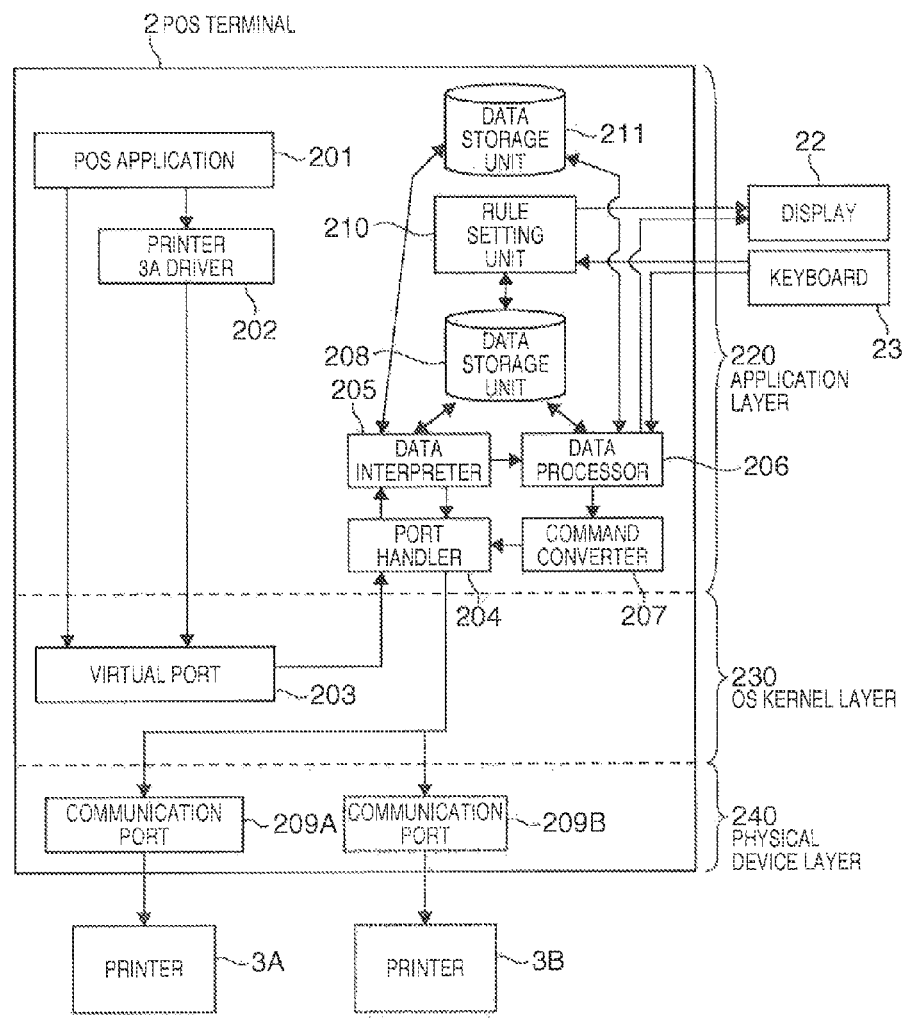
FIG. 2 is a function block diagram of a DOS terminal device.

FIG. 1 shows an example of a POS terminal according to this embodiment of the invention. FIG. 2 is a function block diagram of the POS terminal device. The POS terminal 2 (value-adding device) shown in FIG. 1 and FIG. 2 is a device that uses the invention, and acquires print data (such as receipt data) output from a POS application 201 at a virtual port 203 (data acquisition unit) of the OS kernel layer 230. The POS terminal 2 receives the acquired data at the port handler 204 of the application layer 220, and applies a specific value-adding process (such as adding a coupon) to the data. The processed print data is then output from the port handler 204 to the communication port 209 appropriate to the processed data. By running this process, the POS terminal 2 can easily add value to the print data of the existing POS application 201 without changing the POS application 201 program. The POS terminal 2 also has a function enabling the user to configure the content of the value-adding process, thereby improving user convenience and enabling adding value in different ways.

This embodiment of the invention describes a POS system such as used in a retail store, and as shown in FIG. 1 has a plurality of POS terminals 2 connected through a network 4 to a POS server 1. The POS server 1 is a computer system that manages the plural POS terminals 2, and runs processes to tabulate and manage data acquired from the POS terminals 2.

A POS terminal 2 is installed at each register, and each POS terminal 2 is connected to a printer 3. The printer 3 outputs receipts, for example, based on print data output from the POS terminal 2. The POS terminal 2 is thus positioned as the host device of the printer 3.

As shown in FIG. 1, each POS terminal 2 includes a POS terminal device 21, display 22, keyboard 23, barcode reader 24, and card reader 25. The display 22 displays product prices, for example, to the customer, and the keyboard 23 is used by the operator to input product information including prices and product codes, and customer information such as sex or age. The barcode reader 24 is used to get product information by reading product barcodes. The card reader 25 reads information stored on a card and retrieves information needed to complete the transaction.

The display 22 and keyboard 23 are also used by the user to set rules and select coupons as described below.

The POS terminal device 21 generates and outputs information printed on the receipts or coupons to the printer 3 based on information acquired by the keyboard 23, barcode reader 24, and card reader 25. The POS terminal device 21 is a computer including a CPU, RAM, ROM, and hard disk drive or other storage device not shown. A POS application 201 program described below and a program for a value-adding process are stored in ROM, and processes are executed by the CPU operating according to these programs.

The functional configuration of the POS terminal 2 is shown in FIG. 2. The POS application 201 of the POS terminal 2 runs a process to generate and output the information printed on receipts and coupons, and the data generated at this time is the source data before adding specific value. The generated print data is in the format output directly to the printer 3A, or data in the format passed to the driver 202 of the printer 3A. The former type is generated when generating simple print data for printing plain text.

The printer 3A driver 202 is a printer driver for the printer 3A, and outputs the data output from the POS application 201 as print, data based on the command system for the type of printer 3A (device) so that it can be received and printed by the printer 3A.

As shown in FIG. 2, the POS application 201 and printer 3A driver 202 belong to the application layer 220 on which programs execute processes based on the operating system (OS) of the computer. Both the POS application 201 and printer driver 202 are rendered by programs stored in ROM chat specify the content of each process, and a CPU avid other hardware components that execute processes based on the programs. In addition, the POS application 201 and the driver 20 for the printer 3A are those used by the conventional device to which the invention is applied.

The virtual port 203 receives the print, data (referred to herein as the "original print data") output from the POS application 201 or printer 3A driver 202 at the OS kernel layer 230 where the operating system resides before the data is passed to the communication port 203. The virtual port 203 passes the acquired original print data to the port handler 204.

The port handler 204, data interpreter 205, data processor 206, command converter 207, rule setting unit 210, data storage unit 203, and data storage unit 211 are the value-adding units (data processing units) that use the original print data, and enable adding specific value to the print data output from the POS application 201.

The port handler 204 passes the original print data received from the virtual port 203 to the data interpreter 205, and runs a process that receives print data output from the value-adding process (referred to here as the "processed print data") and outputs the processed print data to the appropriate communication port 209.

The data interpreter 205 analyzes the original print data and determines the content of the process, and determines the communication port 209 to which the processed print data is output. When executing this process, the data interpreter 205 references information (rules as described below) stored in the data storage unit 208 as needed. The data interpreter 205 also stores specific information contained in the analyzed original print data in the data storage unit 211, and references the information accumulated here as needed.

The data processor 206 processes the original print data according to the process content determined by the data interpreter 205. More specifically, print content is added or deleted, or sore specifically print data is added or deleted, in order to add specific value to the original print data. The data processor 205 also runs as needed processes (device-specific processes) that depend on the printer 3 to which the processed print data is output. To execute these processes, the data processor 206 references information in the data storage unit 208 and data storage unit 211 as appropriate.

The command converter 207 runs a process to convert commands when the command language used by the printer 3 connected to the communication port 209 specified by the original print data differs from the command language of the printer 3 connected to the communication port 209 to which the processed print data is output.

The data storage unit 203 stores information used by the data interpreter 205 and data processor 206. The important information that is stored here are the rules of the value-adding process (process conditions and content) that can be set by the user of the POS terminal 2, and the data interpreter 205 determines the content of the process to be executed by the data processor 206 according to these rules.

These rules determine under what conditions (rule (1): when) where in the original print data (rule (2): where) what type of data (rule (3): what) should be processed how (rule (4): now), and plural rules can be stored.

For example, when the original, print data is data for a receipt, there could be a rule that adds (rule (4)) a specific coupon (rule (3)) to the bottom end of the receipt (rule (2)) when the receipt total acquired from the original print data is greater than or equal to a specific amount (rule (1)); and a rule that deletes (rule (4)) the detected information, (rule (3)) from where the information was detected (rule (2)) when information that is not required to be displayed is detected (rule (1)).

More specific examples are described below.

The data required for the data processor 206 to add content to the print content, such as coupon, logo, and advertising data, is stored in the data storage unit 208. Data about the printer 3 connected to the POS terminal 2 that is required for data processing is also stored. Note that the data storage unit 208 is a hard disk drive or other storage device.

The rule setting unit 210 runs the process enabling the user to set the rules described above, and registers the rules in the data storage unit 208 according to information input by the user in conjunction with the display 22 and keyboard 23. Examples of specific processes are described below.

The data storage unit 211 accumulates specific information stored in the original print data sent from the data interpreter 205 as described above. This accumulated data is part of the data required by the data interpreter 205 to determine the process content according to the above rules. For example, information about the products sold, customer information (sex, age), the time of sale, or other information contained in the receipts may be accumulated. The data storage unit 211 could be a hard disk drive, for example.

Specific steps in the process run by the value-adding unit are described below.

Note that the virtual port 203, port handler 204, data interpreter 205, data processor 206, command converter 207, and rule setting unit 210 are rendered by respective programs describing the processes executed by each unit, and a CPU and other hardware components that execute the processes according to the programs. The programs associated with these parts are value-adding programs according to the invention.

The POS terminal 2 also includes communication port 209A on the physical device layer 240 connected to printer 3A. In this embodiment of the invention a printer that is used in a conventional system before the invention is applied thereto is used, without change as printer 3A. Other configurations are also possible.

For example, as indicated by the dotted line in FIG. 2, another printer 3B may be connected to a second communication port 209A with printer 3A being a monochrome printer and printer 3B being a color printer, or a configuration having three or more printers 3 is also conceivable. A configuration in which the printer 3A is a new printer that was not used in a conventional system as described above is also possible. Note that the communication port 209 may be a serial communication COM port or a USB communication port for USB devices, for example.

Figure 3:
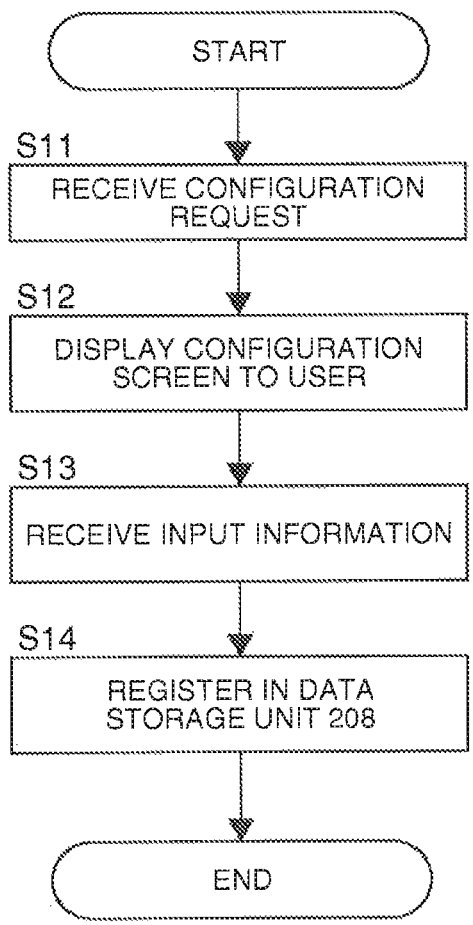
FIG. 3 is a flow chart of the steps executed by the rule setting unit 210.

The POS terminal 2 configured as described above is characterized by applying a value-adding process to the original print data. Specific steps in this process are described below, but the process of setting rules for the value-adding process is described first. FIG. 3 is a flow chart of the steps in a process executed by the rule setting unit 210.

The POS terminal 2 according to this embodiment of the invention can add various types of added-value to the original print data, soon as adding coupons or advertisements to receipts or changing specific information in the receipt to color, and the user can define rules for appropriately executing processes with the desired content.

The user first performs a specific operation using the keyboard 23 to input a request to create a rule. When the rule setting request is received (step S11), the rule setting unit 210 displays a configuration screen to the user on the display 22 (step S12).

The user configuration screen is an interface prompting user input of the desired rule content, that is, input rules (1) to (4) above, to the screen using the keyboard 23.

To make configuration by the user easier, the content displayed in the configuration screen changes sequentially, and rules are configured by repeating this process of displaying prompts and getting user input. For example, the first screen could display a choice between "add coupon" and "add other information," and if "add coupon" is selected, display a choice of "time," "amount" and "other." If "time" is selected, a prompt for inputting the time band when coupons are added is displayed, and then a screen, for selecting or inputting the coupon content is displayed. The displayed prompts thus change in response to user input until all rules are decided.

As the user inputs information, the rule setting unit 210 receives the input, information (step S13), compiles the input content as a new rule, and stores the rule in the data storage unit 208 (step S14). The registered rules are then used in the value-adding process described below.

Figure 4:
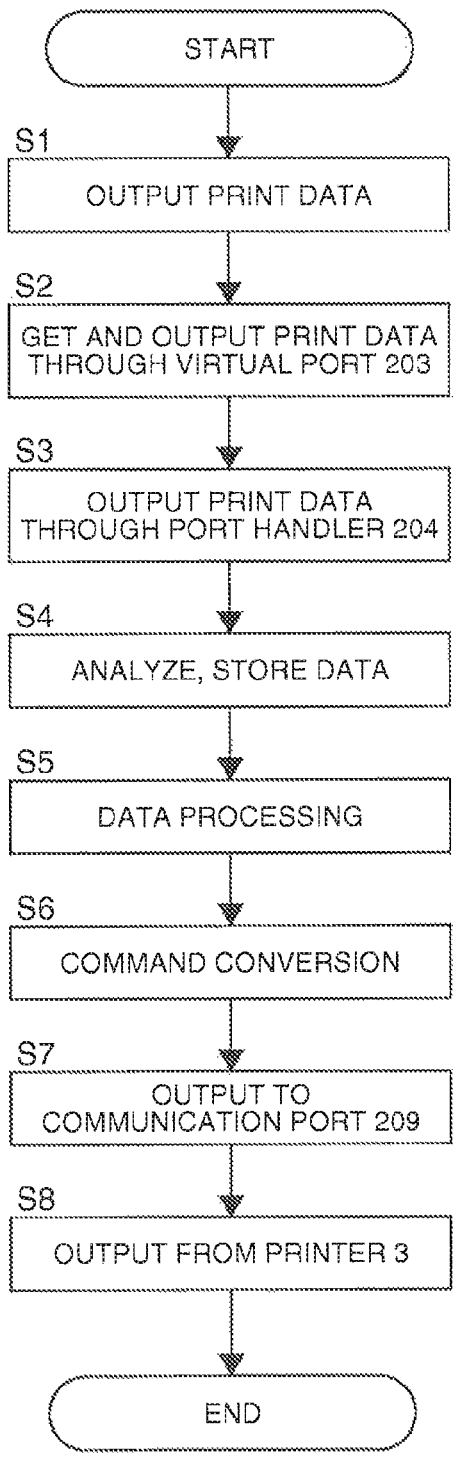
FIG. 4 is a flow chart showing the steps in the value-adding process.

FIG. 4 is a flow chart of the value-adding process. The content of the value-adding process performed by the POS terminal 2 according to this embodiment of the invention is described next with reference to FIG. 4.

As described above, the original print data is output directly from the POS application 201 or through the printer 3A driver 202 (step S1). The original print data used here is print data for a receipt to be output front printer 3A, communication port 209A is therefore specified as the communication port of the output device, and the original print data contains commands for printer 3A.

The output original print data is intercepted by the virtual port 203 before it reaches the specified communication port (communication port 209A in this example) (step S2). This process is achieved by configuring the registry (priority settings) so that data output to any communication port 209 is first received by the virtual port 203. This configuration change is made when the OS boots up. The received original print data is then passed from the virtual port 203 to the port handler 204 on the application layer 220 (step S2).

The port handler 204 then passes the received original print data to the data interpreter 205 (step S3).

The data interpreter 205 interprets the commands in the original print data, and analyzes the data content (step S4). Based on the result of this analysis, the data interpreter 205 then also determines the content of the value to be added (process content), and stores specific information contained in the original print data in the data storage unit 211. When there are two or more printers 3, the data interpreter 205 also determines the communication port 209.

More specifically, the data interpreter 205 reads the rules set in the data storage unit 208 and determines if the condition defined by rule (1) is satisfied. If this condition is met, the data interpreter 205 decides to execute a process of the content described by the rule, that is, the content configured by rules (2) to (4). For example, if the receipt total is detected from the original print data and determined to be greater than the amount defined by rule (1), the data interpreter 205 decides to add a coupon to the receipt according to the content of rules (2) to (4).

The content of the determined process could include adding a coupon, advertising, or logo, changing color, deleting information, or changing the layout, for example, and more specific examples are described below. Note that two or more rules may be set, and if the conditions are met, plural value-adding processes may be applied to a single receipt (original print data).

The output device communication port 209 selected by the data interpreter 205 is reported to the port handler 204.

The content of the process (process content) is then reported to the data processor 206, and the data processor 206 applies the process to the original print data (step S5).

More specifically, the data processor 206 processes the print data according to the determined content of the process, and generates processed print data. A specific example of this process is described below. As described, above, when a process specific to the output printer 3 is required, the data processor 206 also runs that process. Information in the data storage unit 208 and data storage unit 211 may also be referenced as needed in this process. When there are plural, processes to perform according to these rules, the data processor 206 may include plural processing units corresponding to the content of the particular process. In addition, if the data interpreter 205 determines that data processing (adding value) is not needed, the data processor 206 does not perform a processing operation.

When command conversion is required for the processed print data generated by the data processor 206, the command converter 207 runs a command conversion process (step S6). As described above, because the print data is generated with commands that depend on the printer 3 to which the print data is sent, commands must be converted according to the addressed output device when two or more printers 3 are connected and the commands in the original print data differ from the commands of the output printer 3 identified as described above. The processed print data is then passed to the port handler 204. Note that when command conversion is not necessary, the print data sent from the data processor 206 is passed to the port handler 204.

The port handler 204 then outputs the processed print data that was received to the selected communication port 209 (step S7). When two printers 3A and 3B are connected as shown in FIG. 2, the port handler 204 outputs to communication port 209A and/or communication port 209B.

The print data is then sent from the communication port 209 to the connected printer 3, the printer 3 prints according to the received print data, and a receipt or other printout with specific value added is output (step S8). For example, a receipt with a coupon is output from printer 3A. Alternatively, monochrome printing is output from printer 3A, and color printing is output from printer 3B. As another example, a receipt to which a color advertisement was added may be output in color from the printer 3B.

The value-adding process of this POS terminal 2 is executed as described in general terms above, and is described with reference to a more specific example below.

A example of adding a coupon to a receipt output according to the original print data is described first. The process of adding a coupon could be executed according to various conditions and content. More specifically, many different rules could be set.

One example determines whether or not to add a coupon based on system information (information stored on the computer). More specifically, a coupon could be added when the system date (date and time information) kept by the computer embodying the POS terminal 2 meets a specific condition. For example, a specific date period or specific time band could be defined as rule (1) for offering a particular service during a specific date range or time band, and if the system information when the data interpreter 205 receives the original print data is within this date range or time band, the data interpreter 205 decides to add a coupon.

The content of the added coupon could also be determined using system information. For example, in order to set the expiration date of the added coupon to a specific time after the current time (such as one week), a date a specific time from the date indicated by the system information at that time could be inserted to the coupon. Alternatively, the discount offered by a coupon could be changed according to the date range or time band, and the discount rate corresponding to the date/time indicated by the system information could be inserted to the added coupon. This expiration date and discount rate information is also registered as a rule (rule (3)), and the data interpreter 205 determines to insert this information and print according to the rule.

A second, example is determining whether to add a coupon and the content of the added coupon according to specific information contained in the original print data. For example, if the sale total detected from the original print data of the receipt is greater than or equal to a specific amount, a coupon is added, and the discount rate of the coupon is determined according to the amount of the detected total. The discount rate of the coupon could also be determined, according to salesperson information (that is, information identifying the person that handled the transaction) detected from the original print data of the receipt.

In this case the sale total and the salesperson information is registered as rule (1), the discount rate is registered as rule (3), and when adding a coupon the data interpreter 205 determines to print the discount rate stored in the role in the added coupon.

Another example determines whether to add a coupon and the content of the added coupon using information stored in the data storage unit 211. More specifically, the process content can be determined based on past results information and analysis thereof, and is not limited to information contained in the original print data received at that time.

For example, when there are two POS terminals 2, the total number and total amount of products sold in a specific time can be determined from the information stored in the data storage unit 211, and a coupon could be issued when these values exceed a specific amount. In addition, if products that are popular at certain times of day are identified by analyzing accumulated sales information and stored as analysis data, coupons could be issued for popular products during those times. In these cases, the conditions for adding a coupon are registered, as rule (1), and the data, interpreter 205 determines to issue coupons accordingly.

The POS terminal 2 could also connect to the Internet, and the data interpreter 205 could acquire weather information, for example, from a particular site over the Internet and determine the discount rate of coupons based on this information.

As yet another example, the user could be enabled to select the coupon that is added. When adding a coupon is decided in this example, the data processor 200 displays the content of plural coupons saved in rule (3) on the display 22, and adds the coupon selected by the user (customer or store clerk) from among the displayed coupons to the receipt. The user could make the selection in this case by using the keyboard 23 or a display 22 equipped with an input means such as a touch panel.

In order to enable checking for copied or forged coupons when coupons are added, a unique serial number and matching barcode could be embedded in the added coupon. In this case, the new serial number is stored in the data storage unit 208 or data storage unit 211, and the data processor 206 embeds the serial number and matching barcode in the coupon according to the stored serial number.

Several examples of adding a coupon are described above, but other data processes are also conceivable as described below. These data processes include adding data, deleting data, replacing data, and changing the layout.

If the original print data is a receipt, advertisements and logos can be added to the receipt. The data is processed in this case so that the advertisement or logo defined by rule (3) is added to the original print data at the location defined by rule (2).

An underline can also be added to the receipt. This is useful, for clearly separating different kinds of information, such as separating sales receipt information from credit card transaction information.

Confidential information contained in the original print data could also be made unreadable. For example, if the POS application 201 is not compatible with the most recent information security regulations and a credit card number is contained, in the original print data, an asterisk (*) could be printed for part of the credit card number.

The color or density gradation could, also be changed at every carriage return in the original print data. This makes product names and prices easier to read in the receipt, enables balanced use of consumables such as ribbons or ink cartridges containing plural colors of ink, and improves efficiency of use.

Unnecessary information contained in the original print data can also be deleted. For example, if tax laws change after the POS application 201 is written and it is no longer required to display certain information, that information can be deleted from the original print data.

The attributes of text contained in the original print data, such as the font, size, color, and style attributes, can also be changed. This enables adding emphasis to certain information.

Specific examples of adding information are described above, and analysis of print data by the data interpreter 205 can be done by various methods, including interpreting a character string at a specific position in the receipt, and detecting a specific character string or image contained in the original print data.

As described above, a POS terminal 2 according to Lin is embodiment of the invention can add different kinds of value to the print data output from the POS application 201. In addition, a POS terminal device and POS system that do not similarly add value can be improved to the POS terminal 2 and POS system described above by a relatively simple method.

Figure 5:
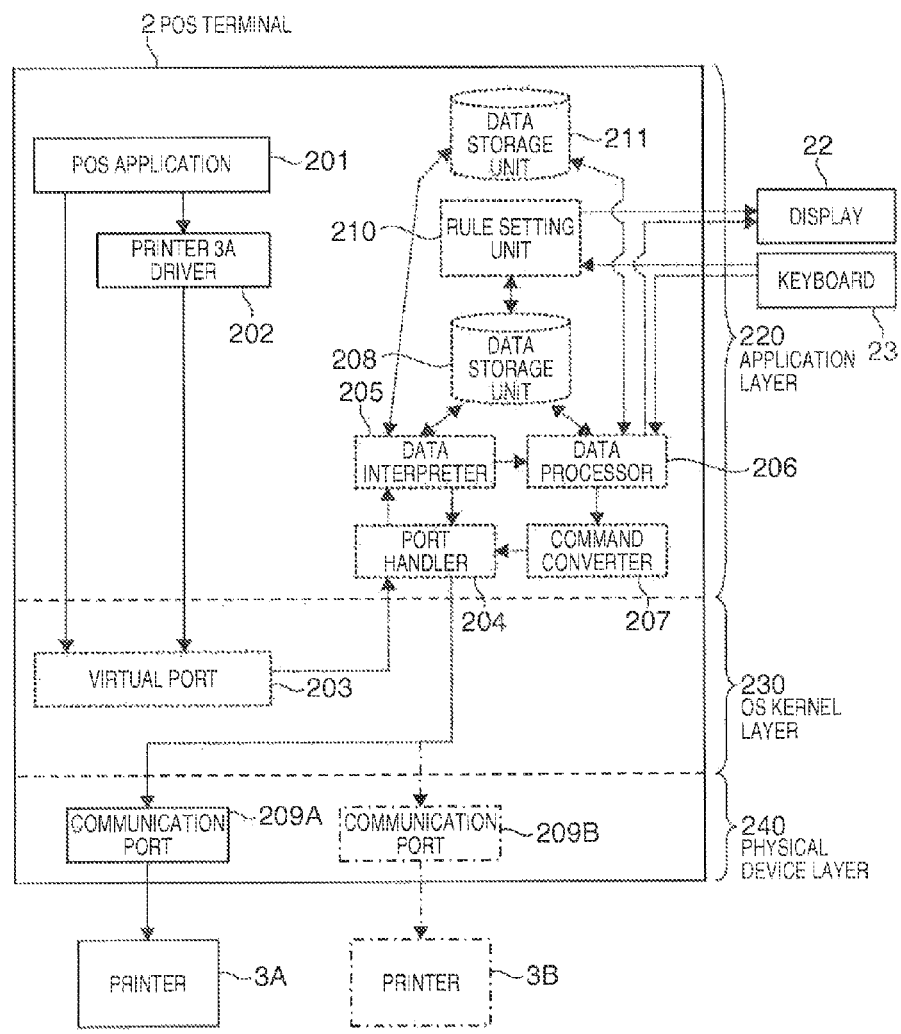
FIG. 5 describes an improvement of the POS system.

FIG. 5 is a block diagram showing such an improvement. FIG. 3 shows the same functional components as in FIG. 2 with the solid lines indicating the POS terminal and POS system before improvement. More specifically, the system before improvement receives print data output directly from the POS application 201 or through the printer 3A driver 202 at the communication port 209A, and outputs from printer 3A. The POS terminal 2 according to this embodiment of the invention and a POS system using the same can be achieved by adding the parts denoted by dotted lines to the existing system.

More specifically, functional expansion of an existing POS system is possible without modifying the existing POS application 201 by adding the value-adding program and the data stored in the data storage unit 208 and data storage unit 211. In addition, a new printer 3B could also be added as indicated by the dot-dash line, and this modification can be done by installing the new printer 3B and installing printer driver software including the program described above and data. The printer 3A and the computer rendering the POS terminal 2 could also be replaced with new devices.

The value-adding method of the invention as described above can thus be used to easily add different binds of value to original print data by means of a method, that does not involve changing the PCS application program. In addition, because the main process for adding value executes on the application layer of the computer, programs that perform a variety of processes can be easily developed. Yet further, when the print data outputs a receipt, various kinds of marketing value can be added, and receipts with high added-value can be issued.

Furthermore, because the value that is added can be suitably configured by the user using the rule setting unit 210, user convenience can be improved. In addition, consumables can also be used more efficiently, and data security can be improved, depending upon the content of the data process.

The POS server 1 is connected, to plural POS terminals 2 in the embodiment described above, but the invention is not so limited and can be adapted to the environment in which the POS terminal and printers, for example, are deployed.

The foregoing embodiment of the invention describes a POS system by way of example, but the invention is not limited to POS systems and can be applied to other types of systems having a specific application including outputting printed materials from a printer, including systems used in hospitals and shipping companies, for example. The invention is particularly useful when modifying an existing application program is difficult.

The POS application program and programs for function expansion processes are stored in ROM in the foregoing embodiment by way of example, but storing these programs is not limited to ROM devices, and RAM, a hard disk drive, or other storage media can be used. The programs can also be stored on separate storage media.

The scope of the invention is not limited to the foregoing embodiments, and includes the invention described in the accompanying claims and equivalents thereof.

What is claimed is:

1. A value-adding method that runs on a computer that operates according to an operating system on an operating system kernel layer, executes a specific process according to an application on an application layer, and has a first communication port and a second communication port, the value-adding method executing a process of adding value to print data output from the application to the first communication port comprising:

a data acquisition step in which the computer acquires the print data from the application on the operating system kernel layer before the print data output from the application is received at the first communication port; and a data processing step in which on the application layer the computer applies a process of adding and/or deleting print content in the print data acquired in the data acquisition step based on information previously registered in the computer, and outputs the data after processing to the second communication port.

2. The value-adding method described in claim 1, wherein:
the process of adding and/or deleting print content is determined based on information contained in the acquired print data.

3. The value-adding method described in claim 1, wherein:
the process of adding and/or deleting print content is determined based on time information kept by the computer.

4. The value-adding method described in claim 1, wherein:
the data processing step includes a step of receiving selection information; and
the process of adding and/or deleting print content is determined based on the received selection information.

5. The value-adding method described in claim 1, wherein:
the data processing step includes a step of accumulating specific information contained in the print data in the computer; and
the process of adding and/or deleting print content is determined based on the accumulated information.

6. The value-adding method described in claim 1, further comprising:
a step of displaying a screen prompting input to the computer on a display unit of the computer, receiving information input to the screen, and generating the information previously registered in the computer according to the received information.

7. The value-adding method described in claim 1, wherein:
the print data is data for a receipt, and adding print content is adding a coupon.

8. The value-adding method described in claim 1, wherein:
the print data is data for a receipt, and adding and/or deleting print content is adding an advertisement or logo.

* * * * *